United States Patent
Arora et al.

(10) Patent No.: US 12,446,088 B2
(45) Date of Patent: Oct. 14, 2025

(54) TUNE AWAY CONFIGURATION FOR A USER EQUIPMENT WITH MULTIPLE SUBSCRIPTIONS

(71) Applicant: QUALCOMM Incorporated, San Diego, CA (US)

(72) Inventors: Mayank Arora, Hyderabad (IN); Rajat Aggarwal, Hyderabad (IN); Ravneet Singh, Hyderabad (IN); Amar Kumar Nandan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 17/995,077

(22) PCT Filed: May 4, 2021

(86) PCT No.: PCT/US2021/070505
§ 371 (c)(1),
(2) Date: Sep. 29, 2022

(87) PCT Pub. No.: WO2021/232037
PCT Pub. Date: Nov. 18, 2021

(65) Prior Publication Data
US 2023/0180320 A1 Jun. 8, 2023

(30) Foreign Application Priority Data
May 13, 2020 (IN) .............................. 202041020167

(51) Int. Cl.
*H04W 36/14* (2009.01)
*H04W 48/18* (2009.01)
*H04W 76/15* (2018.01)

(52) U.S. Cl.
CPC ........... *H04W 76/15* (2018.02); *H04W 36/14* (2013.01); *H04W 48/18* (2013.01)

(58) Field of Classification Search
CPC ..... H04W 76/15; H04W 36/14; H04W 48/18; H04W 48/00; H04W 76/00; H04W 88/06
See application file for complete search history.

(56) References Cited

U.S. PATENT DOCUMENTS 9,210,688 B2    12/2015   Kanamarlapudi et al.
10,623,946 B1 *    4/2020   Kumar .................. H04W 76/16
(Continued)

FOREIGN PATENT DOCUMENTS

WO    2015126842 A1    8/2015
WO    2017193262 A1    11/2017

OTHER PUBLICATIONS

China Telecom: "Consideration on Multi-SIM", 3GPP TSG-RAN WG2 Meeting #111 e, 3GPP Draft, R2-2006981, 3rd Generation Partnership Project (3GPP), Mobile Competence Centre, 650, Route Des Lucioles, F-06921 Sophia-Antipolis Cedex, France, vol. RAN WG2. No. E-Meeting; Aug. 17, 2020-Aug. 28, 2020, Aug. 7, 2020 (Aug. 7, 2020), 3 Pages, XP051911829, The whole document.
(Continued)

*Primary Examiner* — Julio R Perez
(74) *Attorney, Agent, or Firm* — Harrity & Harrity, LLP

(57) ABSTRACT

Various aspects of the present disclosure generally relate to wireless communication. In some aspects, a user equipment may transmit, in association with a first subscription of the UE, a tune away configuration that indicates one or more tune away parameters associated with a second subscription of the UE; tune away from a network connection associated with the first subscription according to the tune away configuration; and perform a communication procedure associated with the second subscription based at least in part on tuning away from the network connection associated with the first subscription. Numerous other aspects are provided.

30 Claims, 8 Drawing Sheets

(56) References Cited

U.S. PATENT DOCUMENTS

| | | | |
|---|---|---|---|
| 11,115,915 B2* | 9/2021 | Lou | H04W 48/18 |
| 11,375,470 B2 | 6/2022 | Zhu et al. | |
| 2017/0230932 A1* | 8/2017 | Challa | H04W 68/02 |
| 2019/0053130 A1* | 2/2019 | Guo | H04L 1/0026 |
| 2020/0380668 A1* | 12/2020 | Schwarzband | G06T 7/60 |
| 2023/0180320 A1* | 6/2023 | Arora | H04W 36/14 |
| | | | 370/329 |

OTHER PUBLICATIONS

International Search Report and Written Opinion—PCT/US2021/070505—ISA/EPO—Aug. 12, 2021.

Motorola Mobility., et al., "Solution for Short and Long Suspension of Connection for Coordinated Leaving", SA WG2 Meeting #S2-136AH, 3GPP Draft, S2-2000276, 3rd Generation Partnership Project (3GPP), Mobile Competence Centre, 650, Route Des Lucioles, F-06921 Sophia-Antipolis Cedex, France, vol. SA WG2. No. Incheon, Jan. 13, 2020-Jan. 17, 2020, Jan. 3, 2020 (Jan. 3, 2020), pp. 1-4, XP051841499, The whole document.

VIVO., et al., "Solution for UE Initiated Leave and Return a Network for Key Issue#3", SA WG2 Meeting #136AH, 3GPP Draft; S2-2001720, 3rd Generation Partnership Project (3GPP), Mobile Competence Centre, 650, Route Des Lucioles, F-06921 Sophia-Antipolis Cedex, France, vol. SA WG2, No. Incheon, Korea; Jan. 13, 2020-Jan. 17, 2020, Jan. 27, 2020 (Jan. 27, 2020), pp. 1-5, XP051845618, The whole document.

* cited by examiner

TUNE AWAY CONFIGURATION FOR A USER EQUIPMENT WITH MULTIPLE SUBSCRIPTIONS

CROSS-REFERENCE TO RELATED APPLICATIONS

This Patent Application is a 371 national stage of PCT Application No. PCT/US2021/070505 filed on May 4, 2021, entitled "TUNE AWAY CONFIGURATION FOR A USER EQUIPMENT WITH MULTIPLE SUBSCRIPTIONS," which claims priority to Indian Patent application Ser. No. 20/204,1020167, filed on May 13, 2020, entitled "TUNE AWAY CONFIGURATION FOR A USER EQUIPMENT WITH MULTIPLE SUBSCRIPTIONS," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for tune away configuration for a user equipment with multiple subscriptions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting, in association with a first subscription of the UE, a tune away configuration that indicates one or more tune away parameters associated with a second subscription of the UE; tuning away from a network connection associated with the first subscription according to the tune away configuration; and performing a communication procedure associated with the second subscription based at least in part on tuning away from the network connection associated with the first subscription.

In some aspects, a method of wireless communication, performed by a base station, may include receiving, in association with a first subscription of a UE, a tune away configuration that indicates one or more tune away parameters associated with a second subscription of the UE; and suspending communications associated with the first subscription of the UE according to the tune away configuration.

In some aspects, a UE for wireless communication may include a memory and one or more processors coupled to the memory. The memory and the one or more processors may be configured to transmit, in association with a first subscription of the UE, a tune away configuration that indicates one or more tune away parameters associated with a second subscription of the UE; tune away from a network connection associated with the first subscription according to the tune away configuration; and perform a communication procedure associated with the second subscription based at least in part on tuning away from the network connection associated with the first subscription.

In some aspects, a base station for wireless communication may include a memory and one or more processors coupled to the memory. The memory and the one or more processors may be configured to receive, in association with a first subscription of a UE, a tune away configuration that indicates one or more tune away parameters associated with a second subscription of the UE; and suspend communications associated with the first subscription of the UE according to the tune away configuration.

In some aspects, a non-transitory computer-readable medium may store one or more instructions for wireless communication. The one or more instructions, when executed by one or more processors of a UE, may cause the one or more processors and/or the UE to transmit, in association with a first subscription of the UE, a tune away configuration that indicates one or more tune away parameters associated with a second subscription of the UE; tune away from a network connection associated with the first subscription according to the tune away configuration; and perform a communication procedure associated with the second subscription based at least in part on tuning away from the network connection associated with the first subscription.

In some aspects, a non-transitory computer-readable medium may store one or more instructions for wireless communication. The one or more instructions, when executed by one or more processors of a base station, may cause the one or more processors to receive, in association with a first subscription of a UE, a tune away configuration that indicates one or more tune away parameters associated with a second subscription of the UE; and suspend communications associated with the first subscription of the UE according to the tune away configuration.

In some aspects, an apparatus for wireless communication may include means for transmitting, in association with a first subscription of the apparatus, a tune away configuration that indicates one or more tune away parameters associated with a second subscription of the apparatus; means for tuning away from a network connection associated with the first subscription according to the tune away configuration; and means for performing a communication procedure associated with the second subscription based at least in part on tuning away from the network connection associated with the first subscription.

In some aspects, an apparatus for wireless communication may include means for receiving, in association with a first subscription of a UE, a tune away configuration that indicates one or more tune away parameters associated with a second subscription of the UE; and means for suspending communications associated with the first subscription of the UE according to the tune away configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
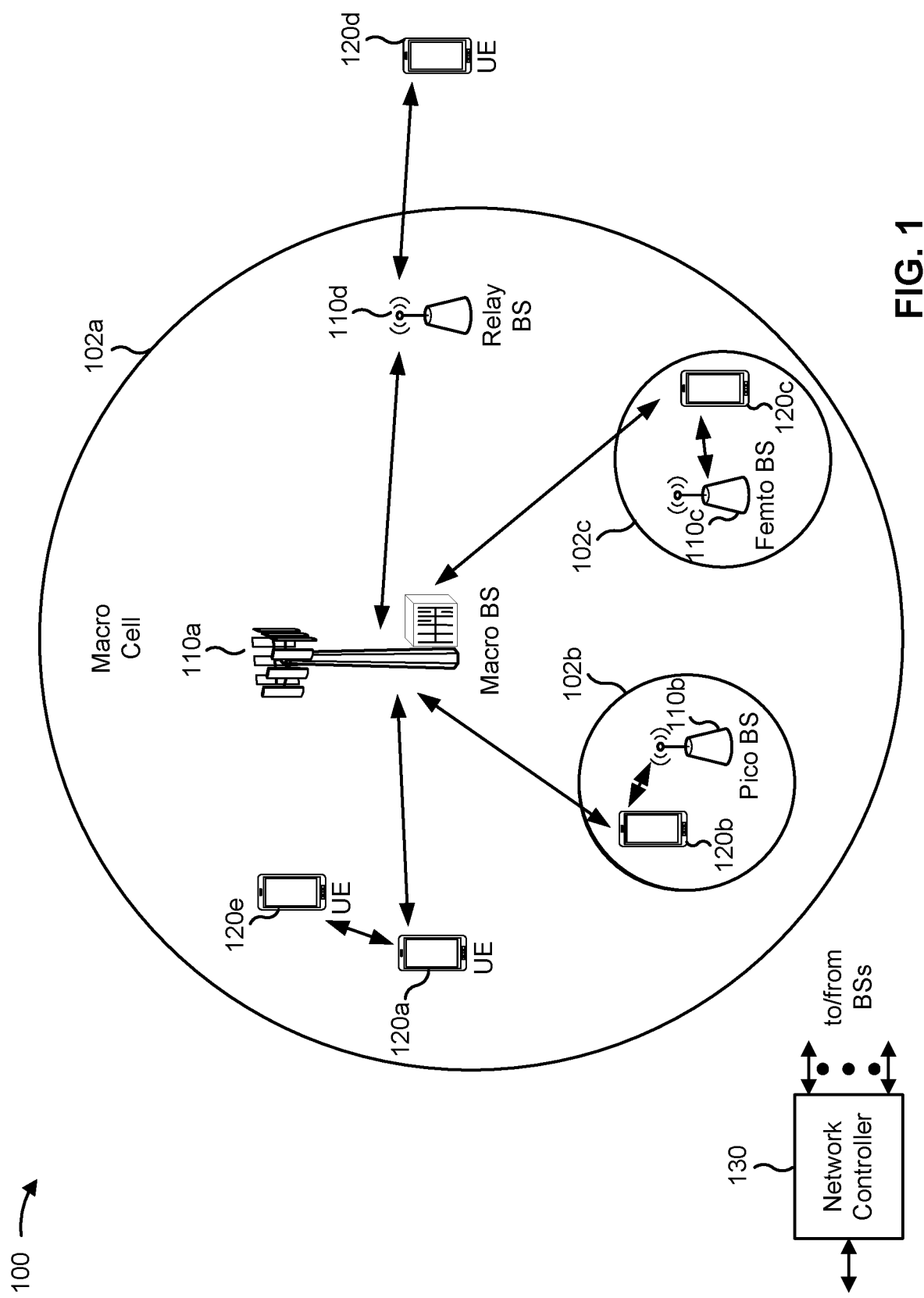
FIG. 1 is a block diagram illustrating an example of a wireless communication network, in accordance with the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
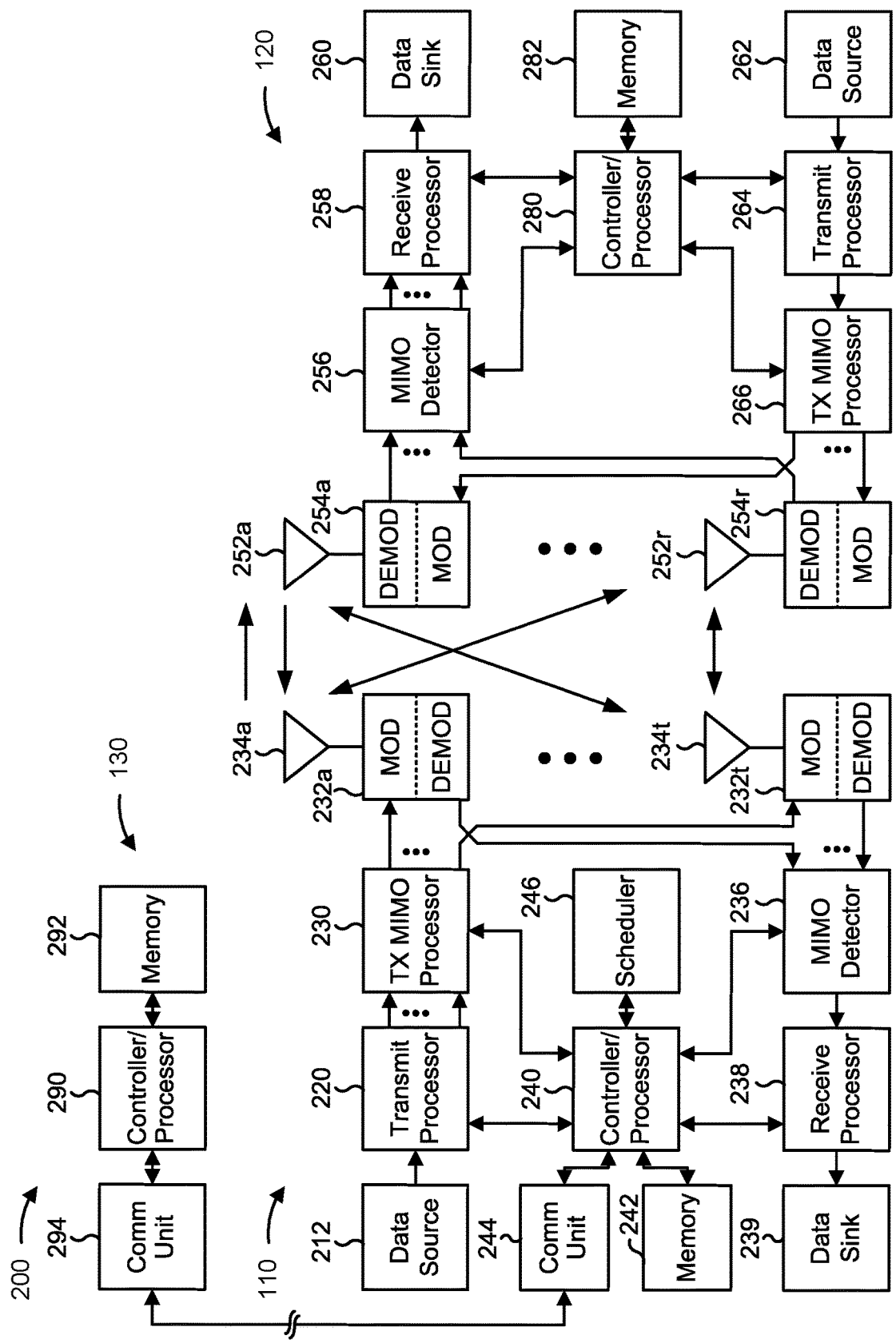
FIG. 2 is a block diagram illustrating an example of a base station in communication with a UE in a wireless communication network, in accordance with the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-8).

Controller/processor 240 of base station 110, controller/processor 280 of UE 120, and/or any other component(s) of FIG. 2 may perform one or more techniques associated with tune away configuration for a user equipment with multiple subscriptions, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for transmitting, in association with a first subscription of the UE, a tune away configuration that indicates one or more tune away parameters associated with a second subscription of the UE; means for tuning away from a network connection associated with the first subscription according to the tune away configuration; means for performing a communication procedure associated with the second subscription based at least in part on tuning away from the network connection associated with the first subscription; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, in association with a first subscription of a UE, a tune away configuration that indicates one or more tune away parameters associated with a second subscription of the UE; means for suspending communications associated with the first subscription of the UE according to the tune away configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
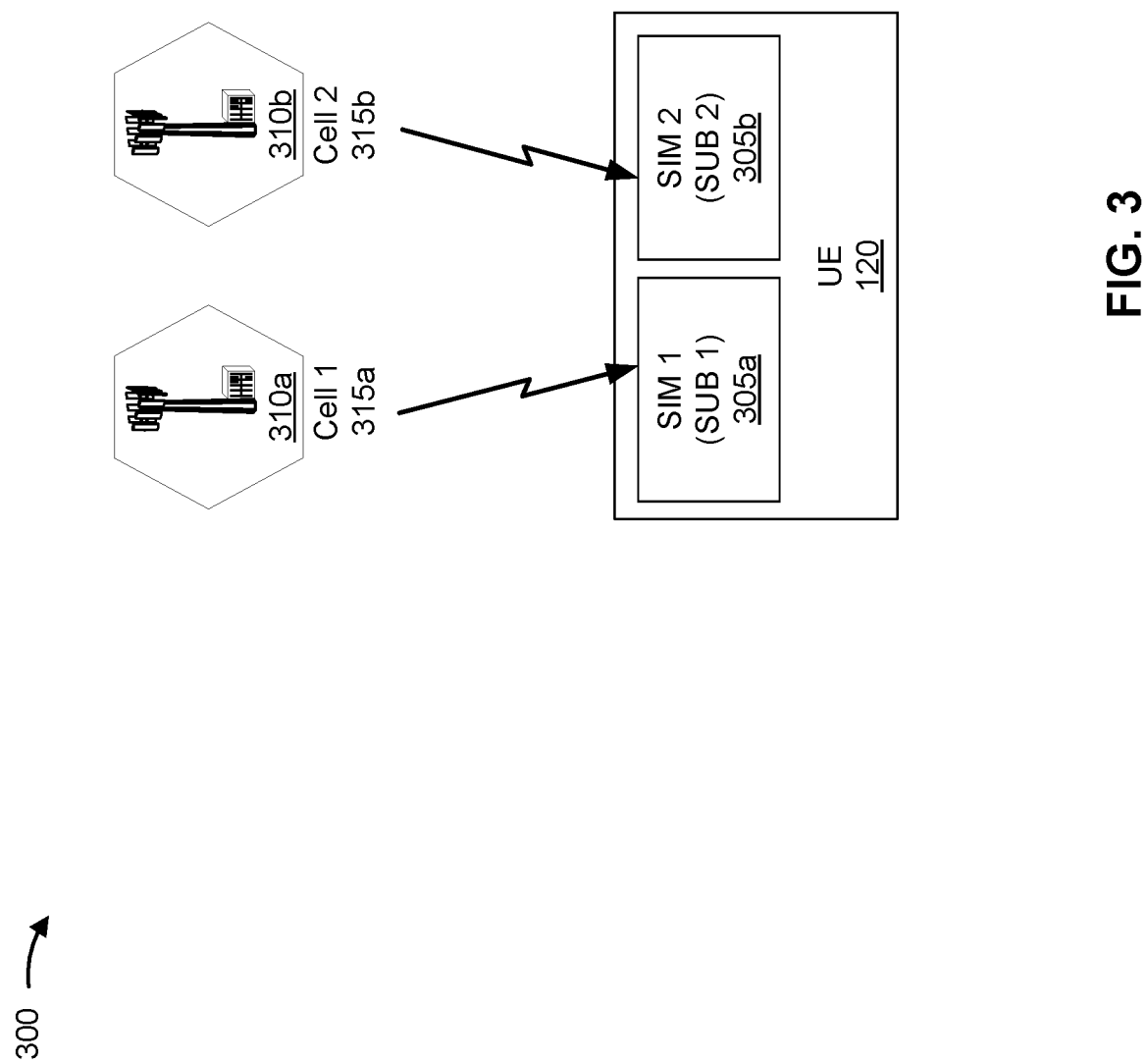
FIG. 3 is a diagram illustrating an example of a multi-subscriber identity module (SIM) UE, in accordance with the present disclosure.

FIG. 3 is a diagram illustrating an example 300 of a multi-subscriber identity module (SIM) UE, in accordance with the present disclosure. As shown in FIG. 3, a UE 120 may be a multiple SIM (multi-SIM) UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may include a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples. As a result, the UE 120 may be unable to receive concurrent messages for multiple subscriptions, and may be more likely to miss messages when those messages occur concurrently for different subscriptions.

For example, if the UE 120 is communicating via the first cell 315a using the first subscription associated with the first SIM 305a, then the UE 120 may miss paging messages that occur for the second subscription associated with the second SIM 305b (e.g., a paging message on the second cell 315b). As another example, if the UE 120 is communicating using the first subscription and a network connection (e.g., an idle or inactive connection) associated with the second subscription is lost, the UE 120 may be unable to receive messages using the second subscription. These scenarios may result in increased latency due to missed messages (e.g., paging messages), may consume network resources and increase signaling overhead due to repetition of messages, or may result in dropped communications if a base station does not repeat messages or if multiple messages are missed by the UE 120.

Some techniques and apparatuses described herein enable a UE 120 (e.g., a multi-SIM UE) to configure and perform tune away from a network connection associated with a first subscription in a manner that is coordinated with a base station 110. As a result, the UE 120 may be enabled to receive messages (e.g., paging messages) associated with a second subscription during the tune away from the first subscription, may be enabled to perform a cell reselection procedure for the second subscription if a network connection associated with the second subscription is lost, and/or may be enabled to perform other communication procedures associated with the second subscription during the tune away from the first subscription. As a result, the UE may avoid or reduce the likelihood of missing messages across different subscriptions, which may lead to reduced latency, reduced signaling overhead, and fewer dropped communications.

Furthermore, by coordinating the tune away with the base station 110, the UE 120 may enable the base station 110 to conserve base station resources (e.g., processing resources, memory resources, antenna resources, and/or the like) that would otherwise be used to attempt to communicate with the UE 120 during a time when the UE 120 is tuned away from the base station 110 (e.g., is tuned away from a cell provided by the base station 110). This also conserves network resources that would otherwise be used to attempt to communicate with the UE 120 during a time when the UE 120 is tuned away from the base station 110.

As indicated above, FIG. 3 is provided as an example. Other examples may differ from what is described with regard to FIG. 3.

Figure 4:
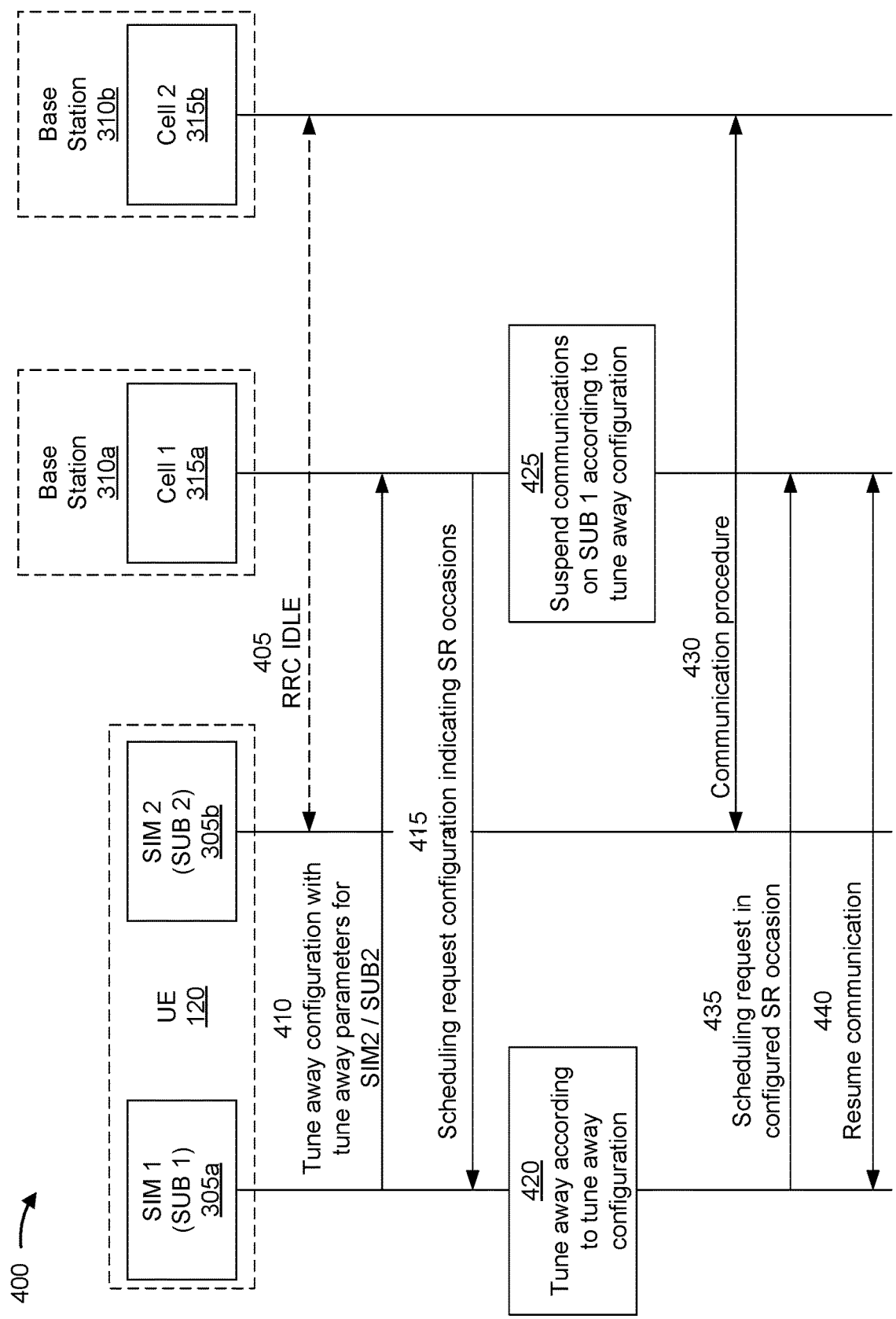
FIGS. 4-6 are diagrams illustrating examples of a tune away configuration for a user equipment with multiple subscriptions, in accordance with the present disclosure.

FIG. 4 is a diagram illustrating an example 400 of a tune away configuration for a UE with multiple subscriptions, in accordance with the present disclosure. As shown in FIG. 4, a UE 120 may be a multi-SIM UE that includes multiple SIMs, shown as a first SIM 305*a* and a second SIM 305*b*, as described above in connection with FIG. 3. As also described above, the first SIM 305*a* may be associated with a first subscription (shown as SUB 1), and the second SIM 305*b* may be associated with a second subscription (shown as SUB 2). The UE 120 may communicate with a first base station 310*a* via a first cell 315*a* (shown as Cell 1) using the first SIM 305*a*, and the UE 120 may communicate with a second base station 310*b* via a second cell 315*b* (shown as Cell 2) using the second SIM 305*b*, as described above in connection with FIG. 3. In FIG. 4, the first base station 310*a* and the second base station 310*b* are shown as separate base stations 110, but may be integrated into a single base station 110 in some aspects.

As shown by reference number 405, the UE 120 may be in a radio resource control (RRC) idle state (or an RRC inactive state) for the second subscription. In this case, the UE 120 does not have an active connection and is not actively communicating via the second cell 315*b* using the second subscription (e.g., is not in an RRC connected state for the second subscription). The UE 120 may have an active connection and/or may be actively communicating via the first cell 315*a* using the first subscription (e.g., in an RRC connected state for the first subscription). Thus, the UE 120 may need to tune away from the first cell 315*a* to receive and/or monitor for a message (e.g., a paging message, a reference signal, and/or the like) on another cell, such as the second cell 315*b*.

As shown by reference number 410, the UE 120 may transmit, in association with the first subscription, a tune away configuration that indicates one or more tune away parameters associated with the second subscription. For example, the UE 120 may transmit the tune away configuration to a base station 310*a* via the first cell 315*a*. The one or more tune away parameters indicated in the tune away configuration may include, for example, a time period during which the UE 120 will tune away from the first cell 315*a* (e.g., to tune to the second cell 315*b*), a start time for the tune away (e.g., a time domain resource, such as a frame, a subframe, a slot, a mini-slot, a symbol, and/or the like), a starting system frame for the tune away (e.g., which may be indicated using a system frame number (SFN), an offset, and/or the like), a starting subframe for the tune away (e.g., which may be indicated using a subframe number (SN), an offset, and/or the like), a starting slot for the tune away (e.g., which may be indicated using a slot number, an offset, and/or the like), a duration for the tune away (e.g., which may be indicated using a quantity of time domain resources, such as a quantity of system frames, a quantity of subframes, a quantity of slots, a quantity of symbols, and/or the like), a periodicity for tune away (e.g., an indication of a recurrence of tune away having an offset from the indicated starting time domain resource and having the indicated tune away duration), and/or the like.

In some aspects, the UE 120 may determine the tune away configuration based at least in part on information associated with the second subscription. For example, the UE 120 may determine one or more paging occasions configured for the second subscription, and may determine the tune away configuration based at least in part on the one or more paging occasions. In some aspects, the UE 120 may receive a configuration (e.g., in an RRC configuration message) for the second subscription, and the configuration may indicate a set of paging occasions for the second subscription. A paging occasion (PO) may include one or more physical downlink control channel (PDCCH) occasions (sometimes referred to as PDCCH monitoring occasions), which may be used to carry a paging message (sometimes referred to as a page). A paging occasion may occur during a time period (e.g., in one or more time domain resources).

In some aspects, the UE 120 may determine the tune away configuration based at least in part on a time period associated with the set of paging occasions configured for the second subscription. For example, the UE 120 may configure the tune away configuration such that the UE 120 will tune away from the first cell 315*a* during a time period in which the set of paging occasions occur, during a time period in which a subset of the set of paging occasions occur, and/or the like. In this way, the UE 120 can receive paging messages for the second subscription when the UE 120 tunes away from the first cell 315*a*. In some aspects, if the UE 120 has more than two subscriptions, the UE 120 may determine the tune away configuration based at least in part on time periods associated with sets of paging occasions configured for multiple subscriptions (e.g., other than the first subscription). For example, the UE 120 may determine the tune away configuration based at least in part on a first time period associated with a first set of paging occasions configured for the second subscription, a second time period associated with a second set of paging occasions configured for the third subscription, and so on, in a similar manner as described above. Furthermore, the UE 120 may transmit, to the second cell 315*b* in association with the second subscription, a tune away configuration determined based at least in part on the first subscription.

In some aspects, the UE 120 may transmit the tune away configuration in a configuration message, such as an RRC message. For example, the UE 120 may transmit the tune away configuration in an RRC setup complete message, an RRC reconfiguration complete message, and/or the like. In some aspects, the UE 120 may transmit the tune away configuration in an RRC setup complete message in association with establishing a network connection with the first base station 310*a* for the first subscription (e.g., via the first cell 315*a*). In some aspects, the UE 120 may transmit the tune away configuration in an RRC reconfiguration complete message in association with reconfiguring a network connection with the first base station 310*a* for the first subscription (e.g., via the first cell 315*a*). In some aspects, the UE 120 may transmit the tune away configuration in an RRC message if the tune away configuration is associated with a recurring tune away (e.g., with a periodicity indicated in the tune away configuration), such as for monitoring paging messages associated with another subscription. Additional details are described below in connection with FIG. 5.

In some aspects, the UE 120 may transmit the tune away configuration to a target base station 110 in an RRC reconfiguration complete message in association with handover to the target base station 110 (e.g., which may be the base station 310a).

Additionally, or alternatively, the UE 120 may transmit the tune away configuration in a UE assistance information message. For example, the UE 120 may transmit the tune away configuration in a UE assistance information message if the tune away configuration is associated with a one-time tune away (e.g., without recurrence or indication of a periodicity associated with the tune away), such as for performing a cell reselection procedure for another subscription. Additional details are described below in connection with FIG. 6.

As shown by reference number 415, a base station 310a communicating with the UE 120 via the first cell 315a may transmit a scheduling request (SR) configuration to the UE 120. In some aspects, the base station 310a may transmit the SR configuration to the UE 120 based at least in part on receiving the tune away configuration from the UE 120. The SR configuration may indicate one or more SR occasions allocated for the UE 120, during which the UE 120 can transmit an SR via the first cell 315a. An SR may normally be used by the UE 120 to indicate that the UE 120 has uplink data (e.g., a physical uplink shared channel (PUSCH) communication) to transmit, and/or to request an uplink grant for the uplink data. Using the techniques described herein, the UE 120 can transmit an SR to the base station 310a via the first cell 315a to indicate that the UE 120 is ready to tune back to the first cell 315a.

In some aspects, the UE 120 may receive a first SR configuration (e.g., in an RRC setup message) that indicates a set of SR occasions for indicating that the UE 120 has uplink data and/or for requesting an uplink grant. The SR configuration received in connection with tune away may be a second SR configuration that is different from the first SR configuration. For example, the second SR configuration may be used to indicate that the UE 120 is ready to tune back to the first cell 315a. In some aspects, the second SR configuration may include SR occasions that occur more frequently in time as compared to the first SR configuration. This may enable the UE 120 to quickly tune back to the first cell 315a rather than waiting until an SR occasion indicated by the first SR configuration occurs. In some aspects, the second SR configuration may be configured based at least in part on the tune away configuration. For example, the SR occasions indicated by the second SR configuration may fall within a time period indicated by the tune away configuration.

As shown by reference number 420, the UE 120 may tune away from the first cell 315a according to the tune away configuration. For example, the UE 120 may tune away from a network connection associated with the first subscription, and may tune to the second cell 315b. The UE 120 may tune away at a time indicated by the tune away configuration (e.g., in a time domain resource indicated in the tune away configuration), for a duration of time indicated by the tune away configuration (e.g., for a set of time domain resources indicated in the tune away configuration), and/or the like. In some aspects, the UE 120 may tune away starting at a time indicated by a system frame number, a subframe number, a slot number, and/or the like, indicated in the tune away configuration. Additionally, or alternatively, the UE 120 may tune away for a duration of time (e.g., a tune away gap) indicated in the tune away configuration.

As shown by reference number 425, the base station 310a that provides the first cell 315a may suspend communications (e.g., downlink communications and/or uplink communications) and/or may suspend a network connection with the UE 120 according to the tune away configuration. For example, the base station 310a may suspend communications and/or a network connection associated with the first subscription. The base station 310a may suspend communications and/or the network connection at a time indicated by the tune away configuration (e.g., in a time domain resource indicated in the tune away configuration), for a duration of time indicated by the tune away configuration (e.g., for a set of time domain resources indicated in the tune away configuration), and/or the like. In some aspects, the base station 310a may suspend communications and/or the network connection starting at a time indicated by a system frame number, a subframe number, a slot number, and/or the like, indicated in the tune away configuration. Additionally, or alternatively, the base station 310a may suspend communications and/or the network connection for a duration of time (e.g., a tune away gap) indicated in the tune away configuration.

As shown by reference number 430, the UE 120 may perform a communication procedure associated with the second subscription. For example, the UE 120 may communicate with the base station 310b that provides the second cell 315b. The UE 120 may perform the communication procedure associated with the second subscription after tuning away from the first cell 315a. The communication procedure may include tuning to the second cell 315b, monitoring one or more paging occasions on the second cell 315b, performing a cell reselection procedure to identify a second cell 315b for establishment of a network connection, and/or the like.

In some aspects, the UE 120 may tune away from the first cell 315a and may perform the communication procedure with the second cell 315b for a duration of time indicated in the tune away configuration (e.g., for an entire duration of time indicated in the tune away configuration). In this case, the UE 120 may tune back to the first cell 315a (and away from the second cell 315b) upon expiration of the duration of time. In this scenario, the UE 120 may not need to transmit an SR to notify the base station 310a that provides the first cell 315a that the UE 120 is ready to tune back to the first cell 315a. For example, if the base station 310a does not receive an SR from the UE 120 prior to expiration of the indicated tune away duration, then the base station 310a may resume communications with the UE 120 upon expiration of the indicated tune away duration.

In some aspects, as shown by reference number 435, the UE 120 may transmit an SR in a configured SR occasion to notify the base station 310a that the UE is ready to resume communications with the base station 310a. In some aspects, the UE 120 may transmit the SR in an SR occasion that occurs upon or after expiration of the tune away duration indicated in the tune away configuration. Alternatively, if the UE 120 completes the communication procedure associated with the second subscription (or if the communication procedure fails) prior to expiration of the tune away duration, then the UE 120 may transmit the SR in an SR occasion that occurs after the communication procedure is completed or fails, and that occurs prior to expiration of the tune away duration. In this way, the UE 120 may resume communications via the first cell 315a earlier than if the UE 120 were to wait for expiration of the tune away duration, which may reduce latency.

In some aspects, the UE 120 may transmit the SR in an SR occasion configured according to the second SR configuration (e.g., an SR configuration received from the base station 310a after transmission of the tune away configuration by the UE 120), as described above. Alternatively (e.g., if the UE 120 does not receive the second SR configuration), the UE 120 may transmit the SR in an SR occasion configured according to the first SR configuration (e.g., a default SR configuration indicated in an RRC setup message).

As shown by reference number 440, the UE 120 may resume communication with the base station 310a via the first cell 315a (e.g., associated with the first subscription). For example, the UE 120 may resume communication based at least in part on completion or failure of the communication procedure associated with the second subscription, based at least in part on expiration of a tune away duration indicated in the tune away configuration, based at least in part on transmitting the SR request (e.g., and receiving a corresponding grant), and/or the like. Based at least in part on resuming communication with the base station 310a via the first cell 315a, the UE 120 may transmit uplink communications to the base station 310a and/or may receive downlink communications from the base station 310a. Additionally, or alternatively, the base station 310a may unsuspend (e.g., may resume) communications associated with the first subscription by transmitting downlink communications to the UE 120 and/or receiving uplink communications from the UE 120 (e.g., uplink communications and/or downlink communications associated with the first subscription).

In this way, the UE 120 may be enabled to receive messages (e.g., paging messages) associated with a second subscription during the tune away from the first subscription, may be enabled to perform a cell reselection procedure for the second subscription if a network connection associated with the second subscription is lost, and/or may be enabled to perform other communication procedures associated with the second subscription during the tune away from the first subscription. As a result, the UE may avoid or reduce the likelihood of missing messages across different subscriptions, which may lead to reduced latency, reduced signaling overhead, and fewer dropped communications.

Furthermore, by coordinating tune away with the base station 310a, the UE 120 may enable the base station 310a to conserve base station resources (e.g., processing resources, memory resources, antenna resources, and/or the like) that would otherwise be used to attempt to communicate with the UE 120 during a time when the UE 120 is tuned away from the base station 310a (e.g., is tuned away from the first cell 315a provided by the base station 310a). This also conserves network resources that would otherwise be used to attempt to communicate with the UE 120 during a time when the UE 120 is tuned away from the base station 310a.

In some aspects, if the UE 120 undergoes a handover from a source base station to a target base station, the source base station may transmit the SR configuration, generated by the source base station, to the target base station (e.g., in handover preparation information). Additionally, or alternatively, the source base station may transmit the tune away configuration, received from the UE 120, to the target base station (e.g., in handover preparation information). The target base station may generate a new SR configuration based at least in part on the SR configuration received from the source base station and/or based at least in part on the tune away configuration. The target base station may transmit the new SR configuration to the UE 120 in a handover command, in an RRC message associated with establishing a connection with the UE 120 (e.g., an RRC reconfiguration message), and/or the like.

In some aspects, the UE 120 may transmit a new tune away configuration to the target base station in connection with the handover procedure (e.g., after completion of the handover procedure), such as in an RRC reconfiguration complete message. The new tune away configuration may indicate a different starting system frame number, a different subframe number, a different slot number, and/or the like, than the tune away configuration indicated to the source base station. In some aspects, the UE 120 may disable tune away (e.g., may refrain from tuning away from a target cell and/or the target base station) until handover is complete. For example, if the UE 120 receives mobility information in an RRC reconfiguration message, then the UE 120 may disable tune away until the UE 120 receives an acknowledgement, from the target base station, in response to an RRC reconfiguration complete message transmitted by the UE 120 to the target base station. In this way, handover errors can be avoided and signaling overhead can be reduced by sharing information between base stations during handover.

As indicated above, FIG. 4 is provided as an example. Other examples may differ from what is described with regard to FIG. 4.

Figure 5:
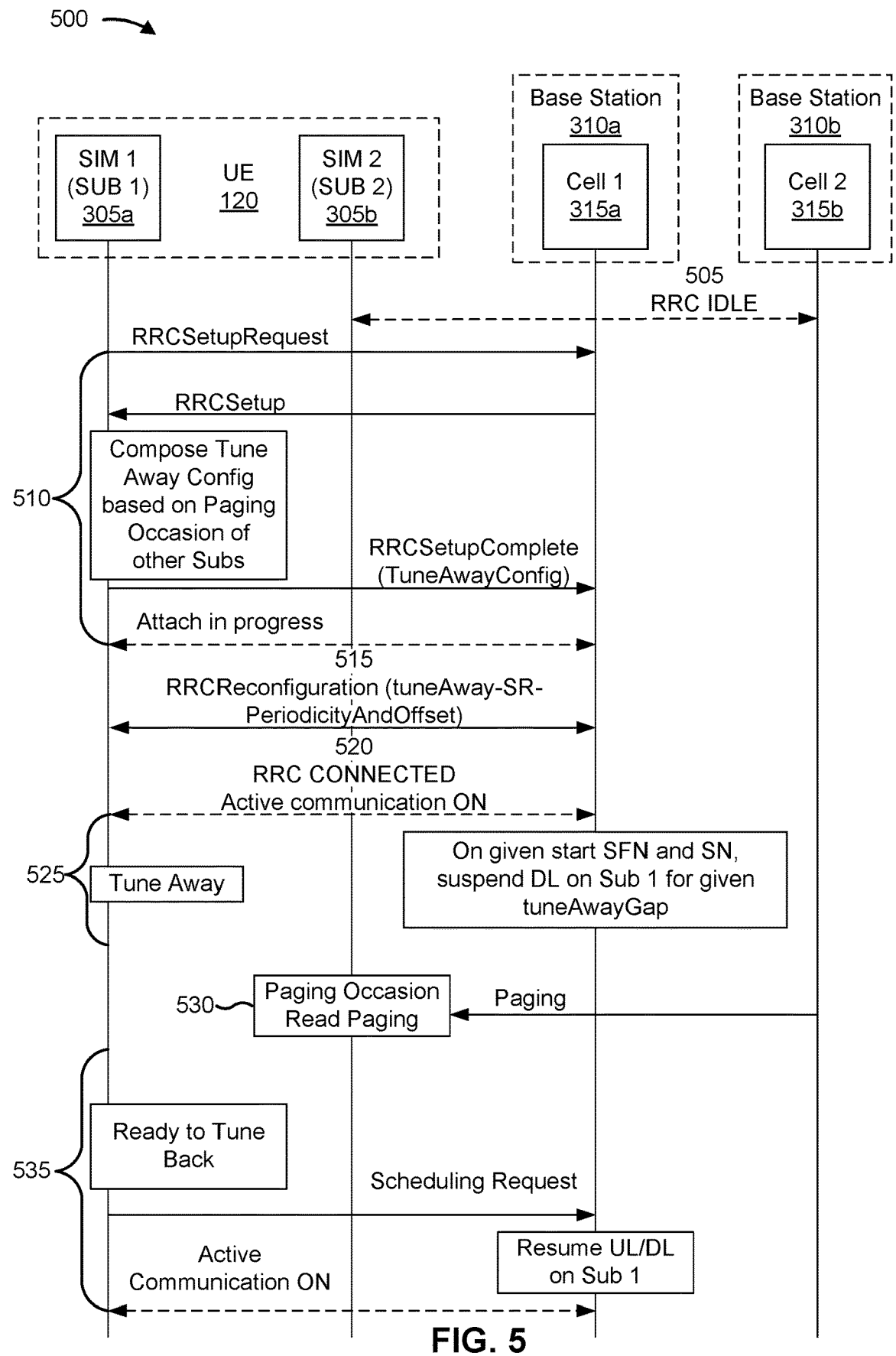

FIG. 5 is a diagram illustrating an example 500 of a tune away configuration for a UE with multiple subscriptions, in accordance with the present disclosure. FIG. 5 shows an example call flow where the UE 120 tunes away from a first cell 315a, associated with a first subscription of the UE 120, to monitor one or more paging occasions on a second cell 315b associated with a second subscription of the UE 120. As shown in FIG. 5, the UE 120 may be a multi-SIM UE that includes multiple SIMs 305 and multiple subscriptions, the UE 120 may communicate with a first base station 310a via a first cell 315a using a first SIM 305a, and the UE 120 may communicate with a second base station 310b via a second cell 315b (shown as Cell 2) using a second SIM 305b, as described above in connection with FIG. 4.

As shown by reference number 505, the UE 120 may be in an RRC idle state (or an RRC inactive state) for the second subscription, as described above in connection with FIG. 4. As shown by reference number 510, the UE 120 may transmit a tune away configuration, as described above in connection with FIG. 4, to the base station 310a during an RRC procedure with the base station 310a. For example, the UE 120 may transmit an RRC setup request message to the base station 310a, may receive an RRC setup message from the base station 310a, and may transmit an RRC setup complete message to the base station 310a. As shown, the RRC setup complete message may include the tune away configuration, which may be determined by the UE 120 based at least in part on paging occasions associated with the second subscription.

As shown by reference number 515, in some aspects, the base station 310a may transmit, to the UE 120, an SR configuration associated with tune away (shown as tune-Away-SR-PeriodicityAndOffset) in an RRC reconfiguration message. As described elsewhere herein, the SR configuration may indicate a set of SR occasions that the UE 120 can use to transmit an SR to indicate that the UE 120 is ready to tune back to the first cell 315a.

As shown by reference number 520, the UE 120 and the base station 310a may complete the RRC procedure, and the UE 120 may enter an RRC connected state with the base station 310a. The UE 120 and the base station 310a may communicate with one another via transmission of uplink data and/or downlink data while the UE 120 is in the RRC connected state. As shown by reference number 525, the UE 120 may tune away from the first cell 315a according to the tune away configuration, and the base station 310a may suspend communications and/or may suspend a network connection with the UE 120 according to the tune away configuration, as described above in connection with FIG. 4.

As shown by reference number 530, after tuning away from the first cell 315*a* and tuning to the second cell 315*b*, the UE 120 may monitor one or more paging occasions on the second cell 315*b* (e.g., associated with the second subscription). In this way, if the base station 310*b* transmits a paging message via the second cell 315*b*, then the UE 120 may be enabled to receive the paging message and take appropriate action (e.g., respond to the paging message, terminate a connection with the first cell 315*a* and connect to the second cell 315*b* via an RRC procedure, return to the first cell 315*a*, and/or the like).

As shown by reference number 535, the UE 120 may tune back to the first cell 315*a* and may resume communication via the first cell 315*a* based at least in part on completion or failure of the communication procedure associated with the second subscription (e.g., based at least in part on monitoring the one or more paging occasions), based at least in part on expiration of a tune away duration indicated in the tune away configuration, based at least in part on transmitting an SR request (e.g., and receiving a corresponding grant), and/or the like.

In this way, the UE 120 may be enabled to receive paging messages associated with a second subscription during the tune away from the first subscription. As a result, the UE may avoid or reduce the likelihood of missing messages across different subscriptions, which may lead to reduced latency, reduced signaling overhead, and fewer dropped communications. Furthermore, by coordinating tune away with the base station 310*a*, the UE 120 may enable the base station 310*a* to conserve base station resources (e.g., processing resources, memory resources, antenna resources, and/or the like) that would otherwise be used to attempt to communicate with the UE 120 during a time when the UE 120 is tuned away from the base station 310*a* (e.g., is tuned away from the first cell 315*a* provided by the base station 310*a*). This also conserves network resources that would otherwise be used to attempt to communicate with the UE 120 during a time when the UE 120 is tuned away from the base station 310*a*.

As indicated above, FIG. 5 is provided as an example. Other examples may differ from what is described with regard to FIG. 5.

Figure 6:
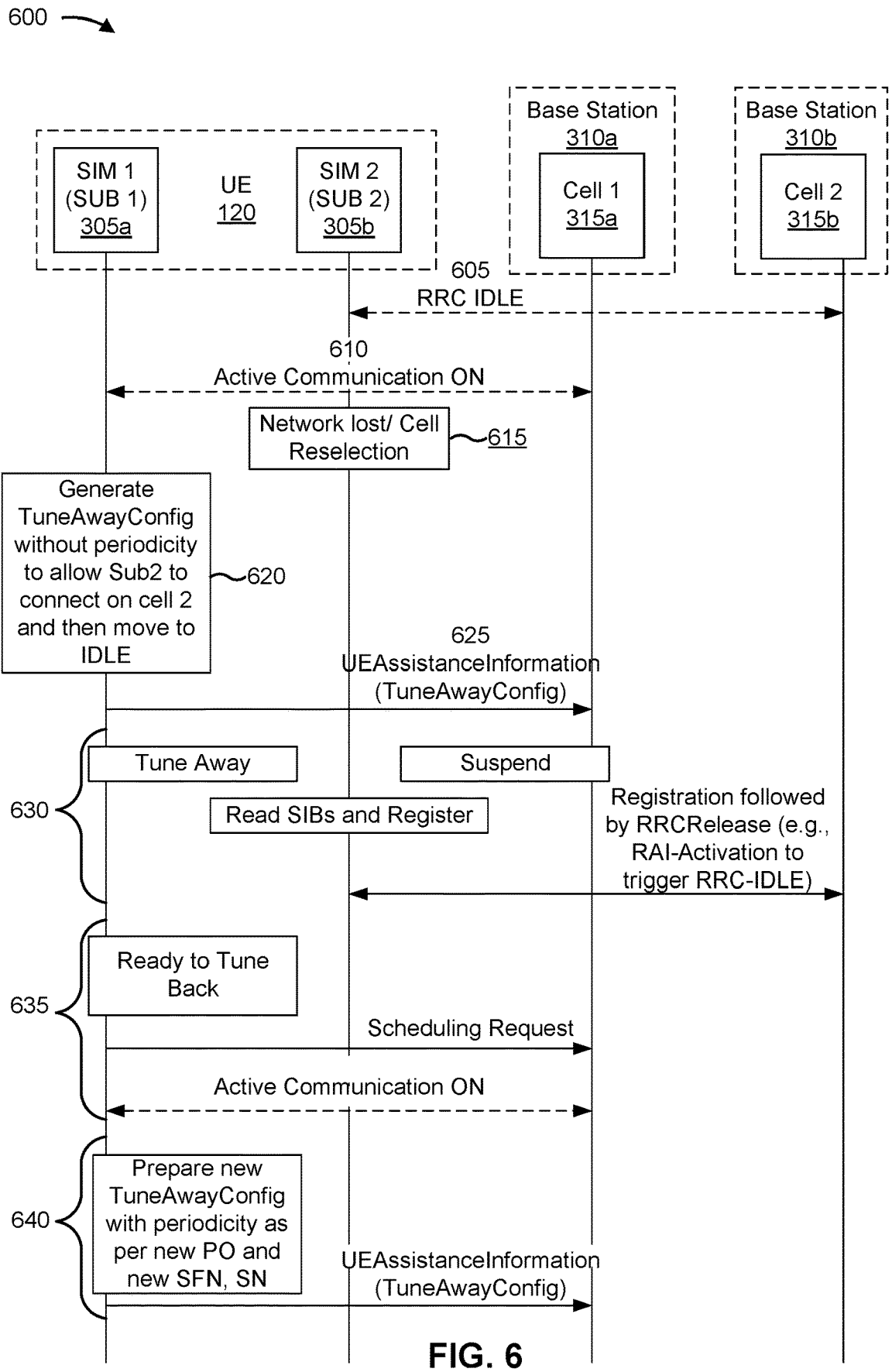

FIG. 6 is a diagram illustrating an example 600 of a tune away configuration for a UE with multiple subscriptions, in accordance with the present disclosure. FIG. 6 shows an example call flow where the UE 120 tunes away from a first cell 315*a*, associated with a first subscription of the UE 120, to perform cell reselection for a second subscription of the UE 120 (e.g., to establish a connection with a second cell 315*b*). As shown in FIG. 6, the UE 120 may be a multi-SIM UE that includes multiple SIMs 305 and multiple subscriptions, the UE 120 may communicate with a first base station 310*a* via a first cell 315*a* using a first SIM 305*a*, and the UE 120 may communicate with a second base station 310*b* via a second cell 315*b* (shown as Cell 2) using a second SIM 305*b*, as described above in connection with FIG. 4.

As shown by reference number 605, the UE 120 may be in an RRC idle state (or an RRC inactive state) for the second subscription, as described above in connection with FIG. 4. As shown by reference number 610, the UE 120 and the base station 310*a* may be actively communicating in an RRC connected state (e.g., after completion of an RRC procedure as described above in connection with reference numbers 510, 515, and 520). As shown by reference number 615, the UE 120 may lose a network connection with a cell used for the second subscription and/or may otherwise need to perform a cell reselection procedure (e.g., due to poor cell signal, among other examples).

As shown by reference number 620, based at least in part on determining that a cell reselection procedure is to be performed for the second subscription, the UE 120 may generate a tune away configuration associated with tuning away from the first cell 315*a* to perform the cell reselection procedure for the second subscription. As shown, the tune way configuration may be for a one-time tune away (e.g., without recurrence), and thus the tune away configuration may exclude (e.g., omit) an indication of a periodicity for the tune away. As shown by reference number 625, the UE 120 may transmit the tune away configuration, associated with performing cell reselection, to the base station 310*a* in a UE assistance information message. In some aspects, the base station 310*a* may transmit an SR configuration to the UE 120 based at least in part on receiving the tune away configuration associated with performing cell reselection. Alternatively, the UE 120 may use another SR configuration received from the base station 310*a* (e.g., in an RRC setup message, in an RRC reconfiguration message associated with periodic tune away, and/or the like).

As shown by reference number 630, the UE 120 may tune away from the first cell 315*a* according to the tune away configuration, and the base station 310*a* may suspend communications and/or may suspend a network connection with the UE 120 according to the tune away configuration, as described above in connection with FIG. 4. After tuning away from the first cell 315*a*, the UE 120 may perform a cell reselection procedure to select a second cell 315*b* for the second subscription. For example, the UE 120 may measure reference signals from one or more neighbor cells, may read system information blocks (SIBs) transmitted by one or more neighbor cells, and may register with a neighbor cell (e.g., the selected second cell 315*b*). In some aspects, the UE 120 may establish an RRC connection with the second cell 315*b* and may initiate and/or trigger release of the RRC connection (e.g., by triggering RRC release). For example, after establishing an RRC connection, the UE 120 may initiate a release assistance indication (RAI) activation procedure by transmitting, to the base station 310*b*, an indication of an empty buffer. For example, the UE 120 may transmit a buffer status report (BSR), in a medium access control (MAC) control element (CE) (collectively, MAC-CE), that indicates a buffer size of zero (e.g., BSR=0). This may trigger the base station 310*b* to release the RRC connection, such as by transmitting an RRC release message.

As shown by reference number 635, the UE 120 may tune back to the first cell 315*a* and may resume communication via the first cell 315*a* based at least in part on completion or failure of the communication procedure associated with the second subscription (e.g., based at least in part on failed or successful cell reselection), based at least in part on expiration of a tune away duration indicated in the tune away configuration, based at least in part on transmitting an SR request (e.g., and receiving a corresponding grant), and/or the like. In some aspects, if cell reselection fails, the UE 120 may wait for a retry duration (e.g., according to a timer for tune away for cell reselection), and may transmit another tune away configuration associated with cell reselection, as described above. Additionally, or alternatively, the UE 120 may transmit another tune away configuration associated with cell reselection after communications on the first cell 315*a* are complete.

As shown by reference number 640, after successful cell reselection, the UE 120 may generate and transmit a new tune away configuration (e.g., in a UE assistance information message) associated with monitoring paging occasions for the second subscription. For example, the UE 120 may determine the tune away configuration based at least in part on information associated with the selected second cell 315b. For example, the UE 120 may determine one or more paging occasions configured for the second cell 315b, and may determine the tune away configuration based at least in part on the one or more paging occasions. In some aspects, the UE 120 may receive a configuration (e.g., in an RRC configuration message) for the second subscription, and the configuration may indicate a set of paging occasions for the second subscription. In this way, the UE 120 may send an updated tune away configuration to the base station 310a via the first cell 315a when the UE 120 selects a new cell (e.g., the second cell 315b) for the second subscription. As indicated, the tune away configuration associated with monitoring paging occasions may indicate a periodicity for the tune away, as described elsewhere herein.

In this way, the UE 120 may be enabled to perform cell reselection for a second subscription during the tune away from the first subscription. As a result, the UE may maintain a connection for the second subscription to avoid or reduce the likelihood of missing messages on the second subscription, which may lead to reduced latency, reduced signaling overhead, and fewer dropped communications. Furthermore, by coordinating tune away with the base station 310a, the UE 120 may enable the base station 310a to conserve base station resources (e.g., processing resources, memory resources, antenna resources, and/or the like) that would otherwise be used to attempt to communicate with the UE 120 during a time when the UE 120 is tuned away from the base station 310a (e.g., is tuned away from the first cell 315a provided by the base station 310a). This also conserves network resources that would otherwise be used to attempt to communicate with the UE 120 during a time when the UE 120 is tuned away from the base station 310a.

As indicated above, FIG. 6 is provided as an example. Other examples may differ from what is described with regard to FIG. 6.

Figure 7:
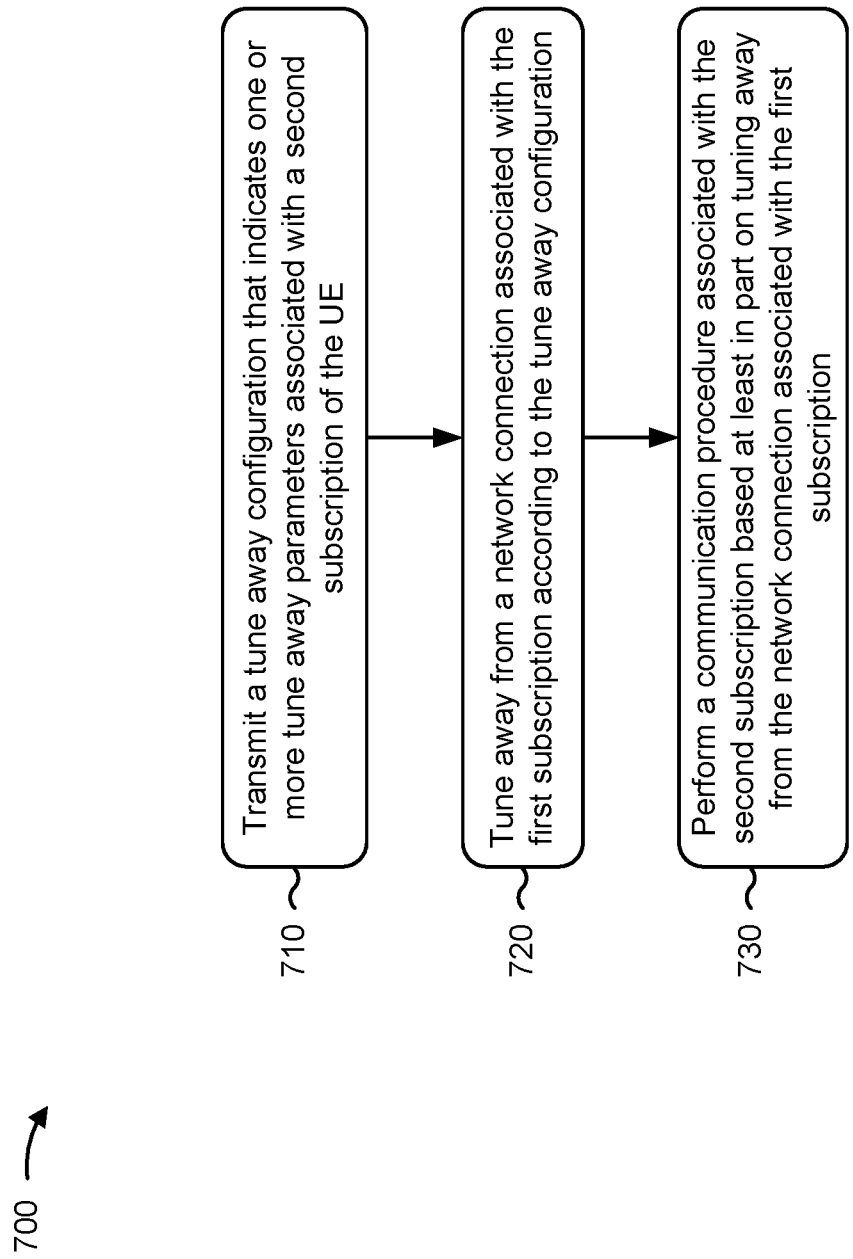
FIG. 7 is a diagram illustrating an example process performed, for example, by a user equipment, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with tune away configuration for a UE with multiple subscriptions.

As shown in FIG. 7, in some aspects, process 700 may include transmitting, in association with a first subscription of the UE, a tune away configuration that indicates one or more tune away parameters associated with a second subscription of the UE (block 710). For example, the UE (e.g., using transmit processor 264, controller/processor 280, memory 282, and/or the like) may transmit, in association with a first subscription of the UE, a tune away configuration that indicates one or more tune away parameters associated with a second subscription of the UE, as described above.

As further shown in FIG. 7, in some aspects, process 700 may include tuning away from a network connection associated with the first subscription according to the tune away configuration (block 720). For example, the UE (e.g., using receive processor 258, transmit processor 264, controller/processor 280, memory 282, and/or the like) may tune away from a network connection associated with the first subscription according to the tune away configuration, as described above.

As further shown in FIG. 7, in some aspects, process 700 may include performing a communication procedure associated with the second subscription based at least in part on tuning away from the network connection associated with the first subscription (block 730). For example, the UE (e.g., using receive processor 258, transmit processor 264, controller/processor 280, memory 282, and/or the like) may perform a communication procedure associated with the second subscription based at least in part on tuning away from the network connection associated with the first subscription, as described above.

Process 700 may include additional aspects, such as any single aspect or any combination of aspects described below and/or in connection with one or more other processes described elsewhere herein.

In a first aspect, the UE is a multi-SIM UE that includes at least a first SIM for the first subscription and a second SIM for the second subscription.

In a second aspect, alone or in combination with the first aspect, the tune away configuration is indicated in at least one of a radio resource control message, a UE assistance information message, a message associated with a handover, or a combination thereof.

In a third aspect, alone or in combination with one or more of the first and second aspects, process 700 includes transmitting a scheduling request associated with the first subscription after performing the communication procedure associated with the second subscription or after expiration of a time period associated with the tune away configuration; and resuming communication associated with the first subscription based at least in part on transmitting the scheduling request.

In a fourth aspect, alone or in combination with one or more of the first through third aspects, process 700 includes receiving a scheduling request configuration based at least in part on transmitting the tune away configuration, wherein the scheduling request configuration indicates a set of scheduling request occasions; and transmitting the scheduling request in a scheduling request occasion, of the set of scheduling request occasions, based at least in part on completing the communication procedure.

In a fifth aspect, alone or in combination with one or more of the first through fourth aspects, the scheduling request is transmitted in a scheduling request occasion of a set of scheduling request occasions indicated in a radio resource control setup message.

In a sixth aspect, alone or in combination with one or more of the first through fifth aspects, the tune away configuration is based at least in part on a set of paging occasions configured for the second subscription, and performing the communication procedure comprises monitoring one or more paging occasions of the set of paging occasions configured for the second subscription.

In a seventh aspect, alone or in combination with one or more of the first through sixth aspects, process 700 includes disabling tune away until handover is complete based at least in part on receiving a handover indication.

In an eighth aspect, alone or in combination with one or more of the first through seventh aspects, the tune away configuration is transmitted based at least in part on a determination to perform a cell reselection procedure for the second subscription, and performing the communication procedure comprises performing the cell reselection procedure for the second subscription.

In a ninth aspect, alone or in combination with one or more of the first through eighth aspects, process 700 includes transmitting, in association with the first subscription, a second tune away configuration after performing the cell reselection procedure, wherein the second tune away configuration is based at least in part on a set of paging occasions configured for the second subscription for a cell selected via the cell reselection procedure; tuning away from the network connection associated with the first subscription according to the second tune away configuration; and monitoring one or more paging occasions of the set of paging occasions configured for the second subscription based at least in part on tuning away from the network connection according to the second tune away configuration.

In a tenth aspect, alone or in combination with one or more of the first through ninth aspects, the one or more tune away parameters include at least one of a start time for tune away, a starting system frame number for tune away, a starting subframe for tune away, a starting slot for tune away, a duration for tune away, a periodicity for tune away, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
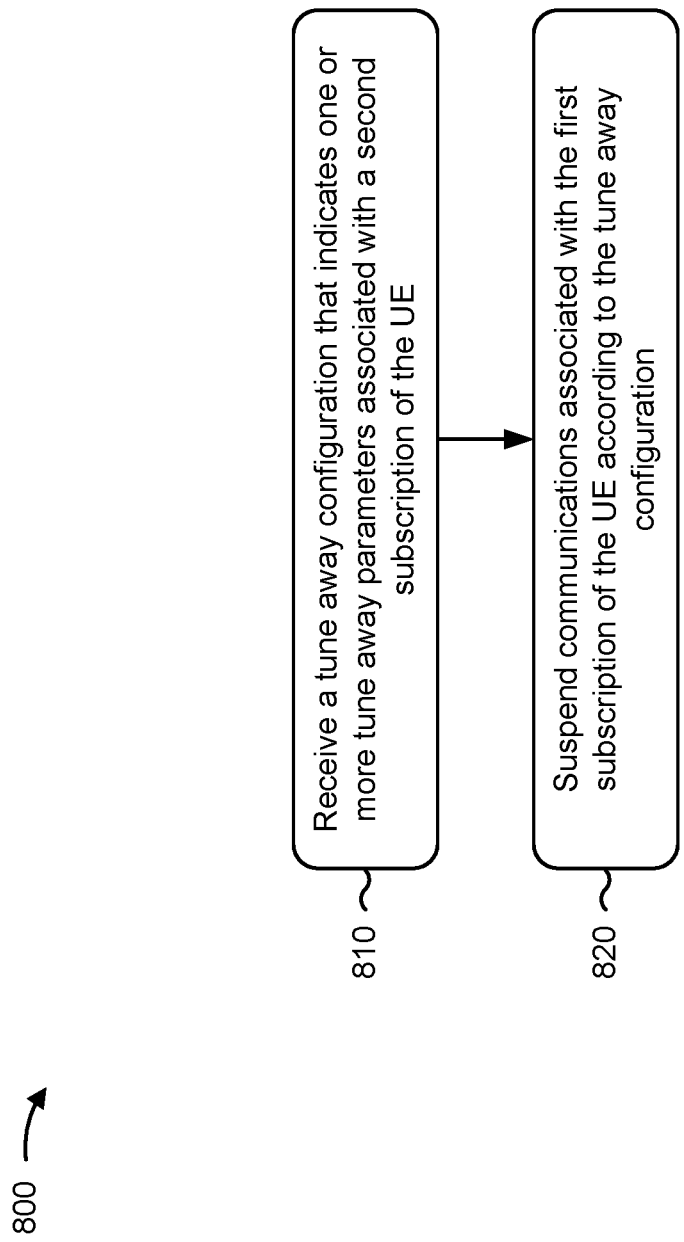
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 and/or the like) performs operations associated with tune away configuration for a UE with multiple subscriptions.

As shown in FIG. 8, in some aspects, process 800 may include receiving, in association with a first subscription of a UE, a tune away configuration that indicates one or more tune away parameters associated with a second subscription of the UE (block 810). For example, the base station (e.g., using receive processor 238, controller/processor 240, memory 242, and/or the like) may receive, in association with a first subscription of a UE, a tune away configuration that indicates one or more tune away parameters associated with a second subscription of the UE, as described above.

As further shown in FIG. 8, in some aspects, process 800 may include suspending communications associated with the first subscription of the UE according to the tune away configuration (block 820). For example, the base station (e.g., using transmit processor 220, receive processor 238, controller/processor 240, memory 242, and/or the like) may suspend communications associated with the first subscription of the UE according to the tune away configuration, as described above.

Process 800 may include additional aspects, such as any single aspect or any combination of aspects described below and/or in connection with one or more other processes described elsewhere herein.

In a first aspect, process 800 includes transmitting a scheduling request configuration to the UE based at least in part on receiving the tune away configuration, wherein the scheduling request configuration indicates a set of scheduling request occasions; receiving a scheduling request in a scheduling request occasion of the set of scheduling request occasions; and resuming communications associated with the first subscription of the UE based at least in part on receiving the scheduling request.

In a second aspect, alone or in combination with the first aspect, process 800 includes transmitting the scheduling request configuration to a target base station in association with a handover procedure.

In a third aspect, alone or in combination with one or more of the first and second aspects, the one or more tune away parameters include at least one of a start time for tune away, a starting system frame number for tune away, a starting subframe for tune away, a starting slot for tune away, a duration for tune away, a periodicity for tune away, or a combination thereof.

In a fourth aspect, alone or in combination with one or more of the first through third aspects, the tune away configuration is received in a radio resource control message after completion of handover of the UE to the base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: transmitting, in association with a first subscription of the UE, a tune away configuration that indicates one or more tune away parameters associated with a second subscription of the UE; tuning away from a network connection associated with the first subscription according to the tune away configuration; and performing a communication procedure associated with the second subscription based at least in part on tuning away from the network connection associated with the first subscription.

Aspect 2: The method of Aspect 1, wherein the UE is a multi-subscriber identity module (SIM) UE that includes at least a first SIM for the first subscription and a second SIM for the second subscription.

Aspect 3: The method of any of Aspects 1-2, wherein the tune away configuration is indicated in at least one of a radio resource control message, a UE assistance information message, a message associated with a handover, or a combination thereof.

Aspect 4: The method of any of Aspects 1-3, further comprising: transmitting a scheduling request associated with the first subscription after performing the communication procedure associated with the second subscription or after expiration of a time period associated with the tune away configuration; and resuming communication associated with the first subscription based at least in part on transmitting the scheduling request.

Aspect 5: The method of Aspect 4, further comprising: receiving a scheduling request configuration based at least in part on transmitting the tune away configuration, wherein the scheduling request configuration indicates a set of scheduling request occasions; and transmitting the scheduling request in a scheduling request occasion, of the set of scheduling request occasions, based at least in part on completing the communication procedure.

Aspect 6: The method of Aspect 4, wherein the scheduling request is transmitted in a scheduling request occasion of a set of scheduling request occasions indicated in a radio resource control setup message.

Aspect 7: The method of any of Aspects 1-6, wherein the tune away configuration is based at least in part on a set of paging occasions configured for the second subscription; and wherein performing the communication procedure comprises monitoring one or more paging occasions of the set of paging occasions configured for the second subscription.

Aspect 8: The method of any of Aspects 1-6, wherein the tune away configuration is transmitted based at least in part on a determination to perform a cell reselection procedure for the second subscription; and wherein performing the communication procedure comprises performing the cell reselection procedure for the second subscription.

Aspect 9: The method of Aspect 8, further comprising: transmitting, in association with the first subscription, a second tune away configuration after performing the cell reselection procedure, wherein the second tune away configuration is based at least in part on a set of paging occasions configured for the second subscription for a cell selected via the cell reselection procedure; tuning away from the network connection associated with the first subscription according to the second tune away configuration; and monitoring one or more paging occasions of the set of paging occasions configured for the second subscription based at least in part on tuning away from the network connection according to the second tune away configuration.

Aspect 10: The method of any of Aspects 1-9, further comprising disabling tune away until handover is complete based at least in part on receiving a handover indication.

Aspect 11: The method of any of Aspects 1-10, wherein the one or more tune away parameters include at least one of a start time for tune away, a starting system frame number for tune away, a starting subframe for tune away, a starting slot for tune away, a duration for tune away, a periodicity for tune away, or a combination thereof.

Aspect 12: A method of wireless communication performed by a base station, comprising: receiving, in association with a first subscription of a user equipment (UE), a tune away configuration that indicates one or more tune away parameters associated with a second subscription of the UE; and suspending communications associated with the first subscription of the UE according to the tune away configuration.

Aspect 13: The method of Aspect 12, further comprising: transmitting a scheduling request configuration to the UE based at least in part on receiving the tune away configuration, wherein the scheduling request configuration indicates a set of scheduling request occasions; receiving a scheduling request in a scheduling request occasion of the set of scheduling request occasions; and resuming communications associated with the first subscription of the UE based at least in part on receiving the scheduling request.

Aspect 14: The method of Aspect 13, further comprising transmitting the scheduling request configuration to a target base station in association with a handover procedure.

Aspect 15: The method of any of Aspects 12-14, wherein the one or more tune away parameters include at least one of a start time for tune away, a starting system frame number for tune away, a starting subframe for tune away, a starting slot for tune away, a duration for tune away, a periodicity for tune away, or a combination thereof.

Aspect 16: The method of any of Aspects 12-15, wherein the tune away configuration is received in a radio resource control message after completion of handover of the UE to the base station.

Aspect 17: An apparatus for wireless communication at a device, comprising a processor; memory coupled with the processor; and instructions stored in the memory and executable by the processor to cause the apparatus to perform the method of one or more Aspects of Aspects 1-14.

Aspect 18: A device for wireless communication, comprising a memory and one or more processors coupled to the memory, the memory and the one or more processors configured to perform the method of one or more Aspects of Aspects 1-11.

Aspect 19: An apparatus for wireless communication, comprising at least one means for performing the method of one or more Aspects of Aspects 1-11.

Aspect 20: A non-transitory computer-readable medium storing code for wireless communication, the code comprising instructions executable by a processor to perform the method of one or more Aspects of Aspects 1-11.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 1-11.

Aspect 22: An apparatus for wireless communication at a device, comprising a processor; memory coupled with the processor; and instructions stored in the memory and executable by the processor to cause the apparatus to perform the method of one or more Aspects of Aspects 12-16.

Aspect 23: A device for wireless communication, comprising a memory and one or more processors coupled to the memory, the memory and the one or more processors configured to perform the method of one or more Aspects of Aspects 12-16.

Aspect 24: An apparatus for wireless communication, comprising at least one means for performing the method of one or more Aspects of Aspects 12-16.

Aspect 25: A non-transitory computer-readable medium storing code for wireless communication, the code comprising instructions executable by a processor to perform the method of one or more Aspects of Aspects 12-16.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 12-16.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting, in association with a first subscription of the UE, a tune away configuration that indicates one or more tune away parameters associated with a second subscription of the UE;
    receiving, a scheduling request configuration based at least in part on transmitting the tune away configuration, wherein the scheduling request configuration indicates a set of scheduling request occasions;
    tuning away from a network connection associated with the first subscription according to the tune away configuration;
    performing a communication procedure associated with the second subscription based at least in part on tuning away from the network connection associated with the first subscription; and
    transmitting, in a scheduling request occasion of the set of scheduling request occasions, a scheduling request associated with the first subscription after performing the communication procedure associated with the second subscription.

2. The method of claim 1, wherein the UE is a multi-subscriber identity module (SIM) UE that includes at least a first SIM for the first subscription and a second SIM for the second subscription.

3. The method of claim 1, wherein the tune away configuration is indicated in at least one of a radio resource control message, a UE assistance information message, a message associated with a handover, or a combination thereof.

4. The method of claim 1, further comprising:
    resuming communication associated with the first subscription based at least in part on transmitting the scheduling request.

5. The method of claim 4, wherein the scheduling request configuration is received in a radio resource control setup message.

6. The method of claim 1, wherein the tune away configuration is based at least in part on a set of paging occasions configured for the second subscription; and
    wherein performing the communication procedure comprises monitoring one or more paging occasions of the set of paging occasions configured for the second subscription.

7. The method of claim 1, wherein the tune away configuration is transmitted based at least in part on a determination to perform a cell reselection procedure for the second subscription; and
    wherein performing the communication procedure comprises performing the cell reselection procedure for the second subscription.

8. The method of claim 7, further comprising:
    transmitting, in association with the first subscription, a second tune away configuration after performing the cell reselection procedure, wherein the second tune away configuration is based at least in part on a set of paging occasions configured for the second subscription for a cell selected via the cell reselection procedure;
    tuning away from the network connection associated with the first subscription according to the second tune away configuration; and
    monitoring one or more paging occasions of the set of paging occasions configured for the second subscription based at least in part on tuning away from the network connection according to the second tune away configuration.

9. The method of claim 1, further comprising disabling tune away until handover is complete based at least in part on receiving a handover indication.

10. The method of claim 1, wherein the one or more tune away parameters include at least one of a start time for tune away, a starting system frame number for tune away, a starting subframe for tune away, a starting slot for tune away, a duration for tune away, a periodicity for tune away, or a combination thereof.

11. A method of wireless communication performed by a network entity, comprising:
    receiving, in association with a first subscription of a user equipment (UE), a tune away configuration that indicates one or more tune away parameters associated with a second subscription of the UE;
    transmitting a scheduling request configuration to the UE based at least in part on receiving the tune away configuration, wherein the scheduling request configuration indicates a set of scheduling request occasions;
    suspending communications associated with the first subscription of the UE according to the tune away configuration;
    receiving a scheduling request in a scheduling request occasion of the set of scheduling request occasions; and
    resuming communications associated with the first subscription of the UE based at least in part on receiving the scheduling request.

12. The method of claim 11, further comprising transmitting the scheduling request configuration to a target network entity in association with a handover procedure.

13. The method of claim 11, wherein the one or more tune away parameters include at least one of a start time for tune away, a starting system frame number for tune away, a starting subframe for tune away, a starting slot for tune away, a duration for tune away, a periodicity for tune away, or a combination thereof.

14. The method of claim 11, wherein the tune away configuration is received in a radio resource control message after completion of handover of the UE to the network entity.

15. A user equipment (UE) for wireless communication, comprising:
- a memory; and
- one or more processors coupled to the memory, the memory and the one or more processors configured to:
  - transmit, in association with a first subscription of the UE, a tune away configuration that indicates one or more tune away parameters associated with a second subscription of the UE;
  - receive a scheduling request configuration based at least in part on transmitting the tune away configuration, wherein the scheduling request configuration indicates a set of scheduling request occasions;
  - tune away from a network connection associated with the first subscription according to the tune away configuration;
  - perform a communication procedure associated with the second subscription based at least in part on tuning away from the network connection associated with the first subscription; and
  - transmit, in a scheduling request occasion of the set of scheduling request occasions, a scheduling request associated with the first subscription after performing the communication procedure associated with the second subscription.

16. The UE of claim 15, wherein the UE is a multi-subscriber identity module (SIM) UE that includes at least a first SIM for the first subscription and a second SIM for the second subscription.

17. The UE of claim 15, wherein the tune away configuration is indicated in at least one of a radio resource control message, a UE assistance information message, a message associated with a handover, or a combination thereof.

18. The UE of claim 15, wherein the UE is further configured to:
- resume communication associated with the first subscription based at least in part on transmitting the scheduling request.

19. The UE of claim 18, wherein the scheduling request configuration is received in a radio resource control setup message, a handover command, or a combination thereof.

20. The UE of claim 15, wherein the tune away configuration is based at least in part on a set of paging occasions configured for the second subscription; and
- wherein the one or more processors, when performing the communication procedure, are configured to monitor one or more paging occasions of the set of paging occasions configured for the second subscription.

21. The UE of claim 15, wherein the tune away configuration is transmitted based at least in part on a determination to perform a cell reselection procedure for the second subscription; and
- wherein the one or more processors, when performing the communication procedure, are configured to perform the cell reselection procedure for the second subscription.

22. The UE of claim 21, wherein the UE is further configured to:
- transmit, in association with the first subscription, a second tune away configuration after performing the cell reselection procedure, wherein the second tune away configuration is based at least in part on a set of paging occasions configured for the second subscription for a cell selected via the cell reselection procedure;
- tune away from the network connection associated with the first subscription according to the second tune away configuration; and
- monitor one or more paging occasions of the set of paging occasions configured for the second subscription based at least in part on tuning away from the network connection according to the second tune away configuration.

23. The UE of claim 15, wherein the UE is further configured to disable tune away until handover is complete based at least in part on receiving a handover indication.

24. The UE of claim 15, wherein the one or more tune away parameters include at least one of a start time for tune away, a starting system frame number for tune away, a starting subframe for tune away, a starting slot for tune away, a duration for tune away, a periodicity for tune away, or a combination thereof.

25. A network entity for wireless communication, comprising:
- a memory; and
- one or more processors coupled to the memory, the memory and the one or more processors configured to:
  - receive, in association with a first subscription of a user equipment (UE), a tune away configuration that indicates one or more tune away parameters associated with a second subscription of the UE;
  - transmit a scheduling request configuration to the UE based at least in part on receiving the tune away configuration, wherein the scheduling request configuration indicates a set of scheduling request occasions;
  - suspend communications associated with the first subscription of the UE according to the tune away configuration;
  - receive a scheduling request in a scheduling request occasion of the set of scheduling request occasions; and
  - resume communications associated with the first subscription of the UE based at least in part on receiving the scheduling request.

26. The network entity of claim 25, wherein the network entity is further configured to transmit the scheduling request configuration to a target network entity in association with a handover procedure.

27. The network entity of claim 25, wherein the one or more tune away parameters include at least one of a start time for tune away, a starting system frame number for tune away, a starting subframe for tune away, a starting slot for tune away, a duration for tune away, a periodicity for tune away, or a combination thereof.

28. The network entity of claim 25, wherein the tune away configuration is received in a radio resource control message after completion of handover of the UE to the network entity.

29. The network entity of claim 25, wherein the scheduling request configuration is transmitted in a radio resource control setup message.

30. The method of claim 11, wherein the scheduling request configuration is transmitted in a radio resource control setup message.

* * * * *